United States Patent
Yang

(10) Patent No.: US 7,431,409 B2
(45) Date of Patent: Oct. 7, 2008

(54) CONNECTING STRUCTURE OF PANELS

(76) Inventor: Shaobin Yang, 34 Appleby La., East Brunswick, NJ (US) 08816

( * ) Notice: Subject to any disclaimer, the term of this patent is extended or adjusted under 35 U.S.C. 154(b) by 0 days.

(21) Appl. No.: 10/483,422

(22) PCT Filed: Aug. 1, 2002

(86) PCT No.: PCT/CN02/00531

§ 371 (c)(1), (2), (4) Date: Jan. 22, 2004

(87) PCT Pub. No.: WO03/013308

PCT Pub. Date: Feb. 20, 2003

(65) Prior Publication Data

US 2004/0222722 A1    Nov. 11, 2004

(30) Foreign Application Priority Data

Aug. 6, 2001    (CN) ............................. 01 2 32822 U

(51) Int. Cl.
*A47B 43/00* (2006.01)
(52) U.S. Cl. .................................. 312/265.5; 312/263
(58) Field of Classification Search .................. 403/256, 403/258, 260; 312/107, 108, 111, 257.1, 312/263, 265.5; 108/193, 101
See application file for complete search history.

(56) References Cited

U.S. PATENT DOCUMENTS

| | | | | | |
|---|---|---|---|---|---|
| 2,967,747 A | * | 1/1961 | Bus | .......................... | 312/265.5 |
| 3,229,334 A | * | 1/1966 | Thome | ........................ | 403/173 |
| 3,830,030 A | * | 8/1974 | Yoshida | ...................... | 52/584.1 |
| 3,837,754 A | * | 9/1974 | Malcik | ........................ | 403/217 |
| 3,864,051 A | * | 2/1975 | Reid | ......................... | 403/408.1 |
| 4,886,326 A | * | 12/1989 | Kuzyk | ....................... | 312/257.1 |
| 5,403,109 A | * | 4/1995 | Johnson et al. | .............. | 403/231 |
| 5,525,005 A | * | 6/1996 | Chen | ........................ | 403/374.4 |
| 5,536,078 A | * | 7/1996 | Novikoff | ..................... | 312/195 |
| 5,536,097 A | * | 7/1996 | Hazan | ......................... | 403/171 |
| 5,810,505 A | * | 9/1998 | Henriott et al. | .............. | 403/230 |

FOREIGN PATENT DOCUMENTS

DE             1004002394         *   8/2005

* cited by examiner

*Primary Examiner*—Janet M Wilkens

(57) ABSTRACT

A panel interlocking structure for adjacent panels of knock down, panel-based furniture, comprising interlock assemblies and connecting panels. Each interlock assembly consists one interlock tube, at least two cubical nuts and at least two interlock bolts. To form the interlock assembly, on a predetermined lengthen rectangular face of the interlock tube, via its corresponding predrilled trans-passing holes, fasten a predetermined number of the interlock bolts into the corresponding tread holes of the cubical nuts positioned inside the interlock tube, with each groove end of the interlock bolt positioned outwardly. Each connecting panel consists one cam lock side and two connection ends. Through the interlocking hole on the predetermined connection end of the connecting panel, the groove end of each interlocking bolt on the interlock assembly is inserted into the corresponding opening of the rotatable cam lock disposed in the dead end hole on the cam lock side of the connecting panel, and securely engages with the connecting panel by fastening the rotatable cam lock, thus thrusting engage forces to the groove end of each interlock bolt on the interlock assembly. All connecting panels are inter-connected via number of interlock assemblies. The invention provides improved durability, enhanced mobility, design-it-yourself capacity, as well as composition expandability for knock down, panel based furniture.

4 Claims, 6 Drawing Sheets

CONNECTING STRUCTURE OF PANELS

BACKGROUND OF THE INVENTION

1. Field of the Invention

This invention relates to a panel interlocking structure for adjacent panels of knock down, panel based furniture, in particular, a panel interlocking structure providing improved durability, enhanced mobility, design-it-yourself capacity, as well as composition expandability for knock down, panel based furniture.

2. Description of Prior Art

Typical knock down, panel based furniture consists of different panels in a direct connection relationship, with pre-determined size, style and color. The problems with the typical panel based furniture include: panels can be easily damaged during assembling and disassembling, thus affecting the durability and mobility of the furniture; the composition of the furniture, including size, style and color has to be pre-determined by the manufacturer, leaving customer limited capacity to choose according their preferences; once the furniture is purchased and assembled, it is vitally impossible for customer to change the original composition, and to expand its storage capacity.

This invention is intent to address problems stated above by providing a panel interlocking structure wherein adjacent panels are connected via an interlock assembly rather than in a conventional direct connection relationship.

SUMMARY OF THE INVENTION

The objective of this invention is to address problems stated above by providing:

a panel interlocking structure wherein adjacent panels of knock down, panel based furniture are connected via an interlock assembly rather than in a direct connection relationship, thus the durability of the furniture is improved;

a panel interlocking structure wherein adjacent panels of knock down, panel based furniture are easy to assemble and disassemble, thus the mobility of the furniture is enhanced;

a panel interlocking structure wherein knock down, panel based furniture incorporating with the panel interlocking structure can be packaged and marketed in the form of assembling components, such as predetermined size and color of interlocking assemblies and connecting panels rather than conventional complete furniture set of fixed size, color and style, thus giving user the design-it-yourself capacity;

a panel interlocking structure wherein knock down, panel based furniture incorporating with the panel interlocking structure will have the expandability via the versatile interlocking assembly, thus additional portion can be added onto the original furniture composition.

In accordance with the invention, the panel interlocking structure for adjacent panels of knock down, panel based furniture, comprises the interlock assemblies and the connecting panels.

Each interlock assembly consists one interlock tube, at least two cubical nuts and at least two interlock bolts, wherein:

the interlock tube has a lengthen rectangular faces with a continual square cross-section to its full length, on each said lengthen rectangular face has at least two predrilled trans-passing holes each on a predetermined position;

the cubical nut has six square faces, at the center of each square face has one predrilled thread hole, with the central line of each predrilled thread hole intersect at the center point of the cubical nut, and at least two cubical nuts are to be disposed inside the interlock tube in predetermined positions, with four predrilled thread holes on the cubical nut each opening to one corresponding trans-passing holes on one lengthen rectangular face of the interlock tube;

the interlock bolt consisting two engaging ends naming the thread end and the groove end. The thread end has threads corresponding to the predrilled thread hole of the cubical nut. The groove end has a concaved annular groove.

To form the interlock assembly, each interlock bolt is to be securely engaged with the interlock tube by fastening its tread end into the corresponding predrilled thread hole of the cubical nut through the predrilled trans-passing hole of the interlock tube, and with its groove end positioned outwardly for interlocking with connecting panel. At least two interlock bolts are to be engaged onto one lengthen rectangular face of the interlock tube in forming the interlock assembly.

Each connecting panel has two opposed large surfaces and four small ends extending at right angles to said large surfaces, wherein:

one side of the large surfaces, naming the cam lock side, has at least four predrilled dead end holes each with a rotatable cam lock disposed in it;

two opposed sides of the small ends, naming the connection end, each consists at least two predrilled interlocking holes, each at a position corresponding to one trans-passing hole on the interlock tube, with their bottom openings open to, and forming perpendicular relations with the corresponding predrilled dead end holes on the cam lock side of the connecting panel;

the rotatable cam lock has one opening and one locking clasp, with its opening open onto the corresponding predrilled interlocking hole on the connection end of the connecting panel, and its locking clasp corresponding to the concaved annular groove on the groove end of the interlock bolt.

The panel interlocking structure securely engages the interlock assembly and the connecting panel by inserting the groove end of each interlock bolt on the interlock assembly into the opening of the rotatable cam lock disposed in the predrilled dead end hole on the cam lock side of the connecting panel through one corresponding predrilled interlocking hole on the connecting end of the connecting panel, and, turning the rotatable cam lock around 90° clockwise by a screw driver, thus the locking clasp of the rotatable cam lock thrusts engaging forces on the groove end of the interlock bolt on the interlock assembly.

Each interlock tube has four lengthen rectangular faces, each can be used to engage with one connecting panel. Thus, each interlock assembly can interlock up to four connecting panels in four directions.

DETAILED DESCRIPTION OF PREFERRED EMBODIMENTS

Embodiment 1

Figure 1:
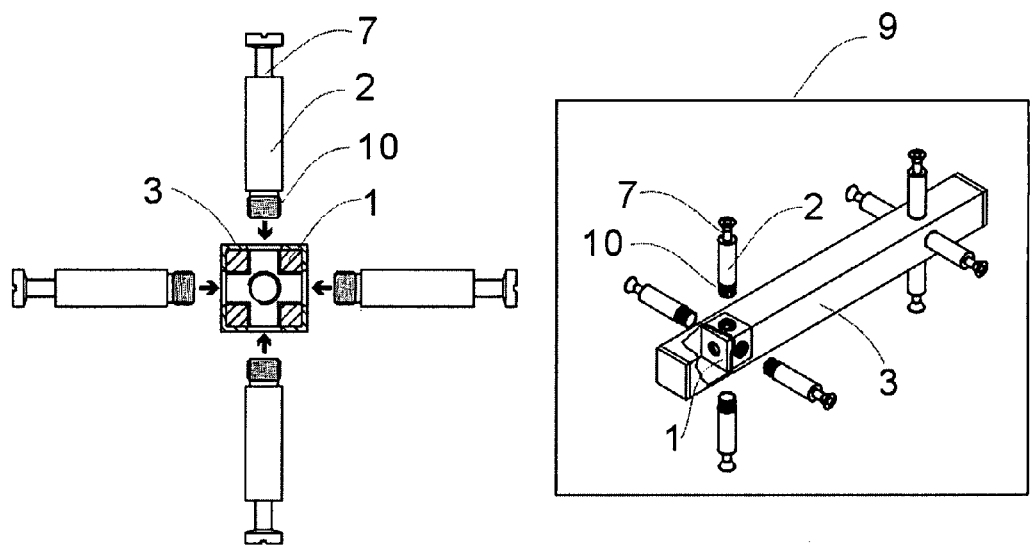
FIG. 1 provides a cross-sectional view and an exploded view of the interlock assembly showing the relationship between the interlock tube, the cubical nut, and the interlock bolt in this invention.
Figure 2:
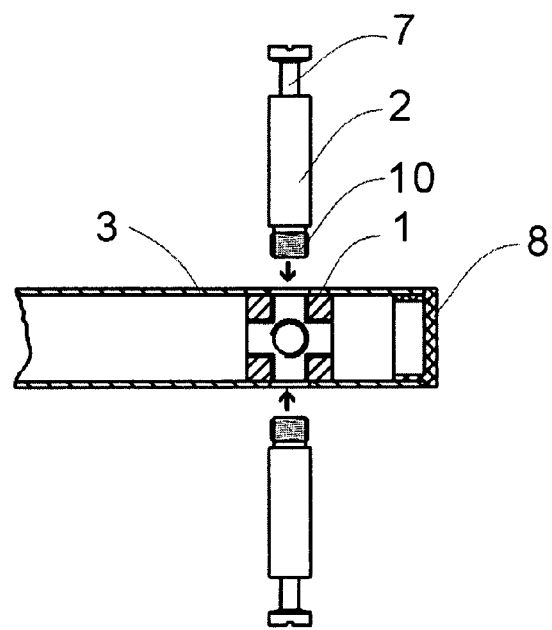
FIG. 2 is a side sectional view of the interlock assembly showing the relationship between the interlock tube, the cubical nut, the interlock bolt.
Figure 3:
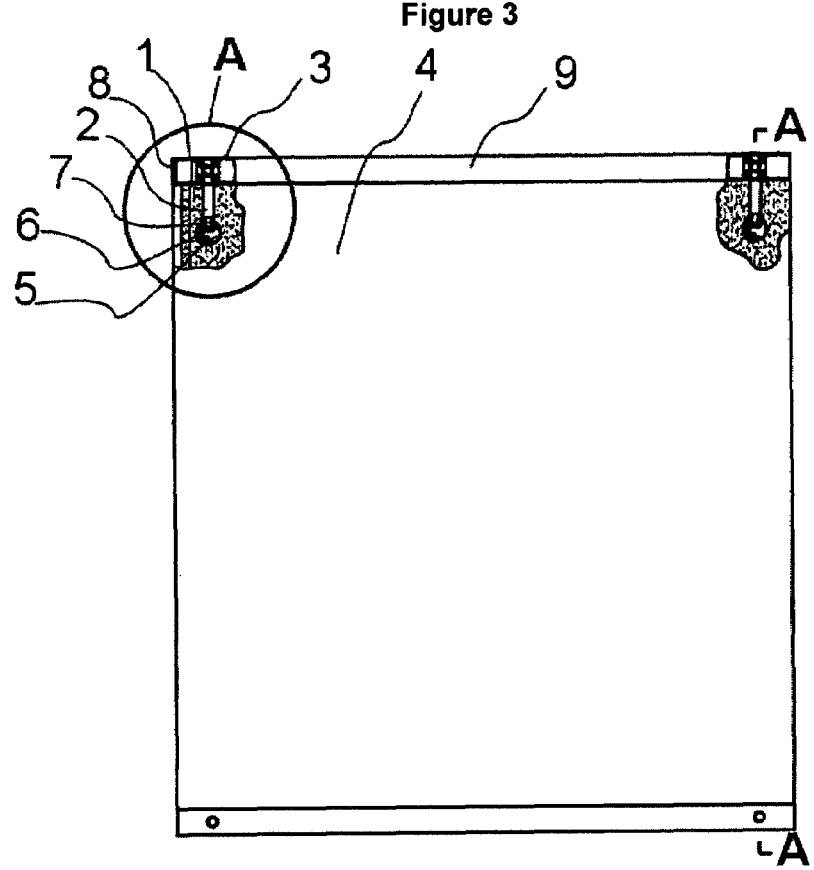
FIG. 3 is a schematic view of the panel interlocking structure showing the relationship between the interlock assembly and the connecting panel.

As shown in FIG. 1 to FIG. 6, the panel interlocking structure is comprising interlock assemblies 9 and connecting panels 4, in which each interlock assembly 9 consists one interlock tube 3, at least two cubical nuts 1 and at least two interlock bolts 2.

The interlock tube 3 has four lengthen rectangular faces with a continual square cross-section to its full length, and each lengthen rectangular face has at least two predrilled trans-passing holes each on a predetermined position.

Each of the cubical nut 1 has six square faces, at the center of each said square face has one predrilled thread hole, with the central line of each said predrilled thread hole intersect at the center point of the said cubical nut 1, and at least two said cubical nuts 1 are to be disposed inside the said interlock tube 3 in predetermined positions, with four predrilled thread holes on the said cubical nut 1 each opening to one corresponding trans-passing holes on one lengthen rectangular face of the said interlock tube 3.

Each of the interlock bolt 2 consists two engaging ends naming the thread end 10 and the groove end 7, wherein the thread end has threads corresponding to the threads of the predrilled thread hole of the said cubical nut 1, and the groove end 7 has a concaved annular groove.

The thread end 10 of the interlock bolt 2 is to be fastened into one predrilled thread hole of the cubical nut 1 through the predrilled trans-passing hole on the said interlock tube 3, thus securely engaged with the said interlock tube 3 and with its groove end 7 positioned outwardly. At least two interlock bolts 2 are to be engaged onto one lengthen rectangular face of the said interlock tube 3 in forming the said interlock assembly 9.

Each of the said connecting panel 4 has two opposed large surfaces and four small ends extending at right angles to the said large surfaces, wherein on one side of the said large surfaces, naming the cam lock side, has at least four predrilled dead end holes 5 each with a rotatable cam lock 6 disposed in it, and, wherein on two opposed sides of the said small ends, naming the connection end, each consists at least two predrilled interlocking holes each at a position corresponding to one trans-passing hole on the said interlock tube 3, with their bottom openings open to, and forming perpendicular relations with the corresponding said predrilled dead end holes 5 on the cam lock side of the said connecting panel 4.

Each of the said rotatable cam lock 6 disposed in the predrilled dead end hole 5 on the cam lock side of the said connecting panel 4 has one opening and one locking clasp, with its opening open onto the corresponding predrilled interlocking hole on the said connection end of the connecting panel 4, and its locking clasp corresponding to the said concaved annular groove on the groove end 7 of the interlock bolt 2.

Figure 4:
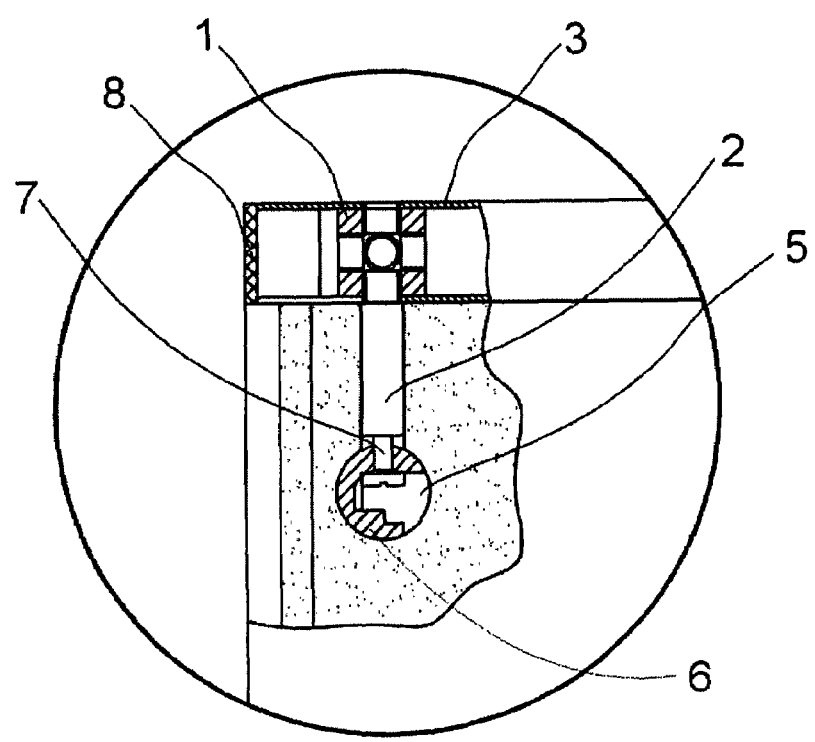
FIG. 4 is an amplified view of Section A in FIG. 3.
Figure 5:
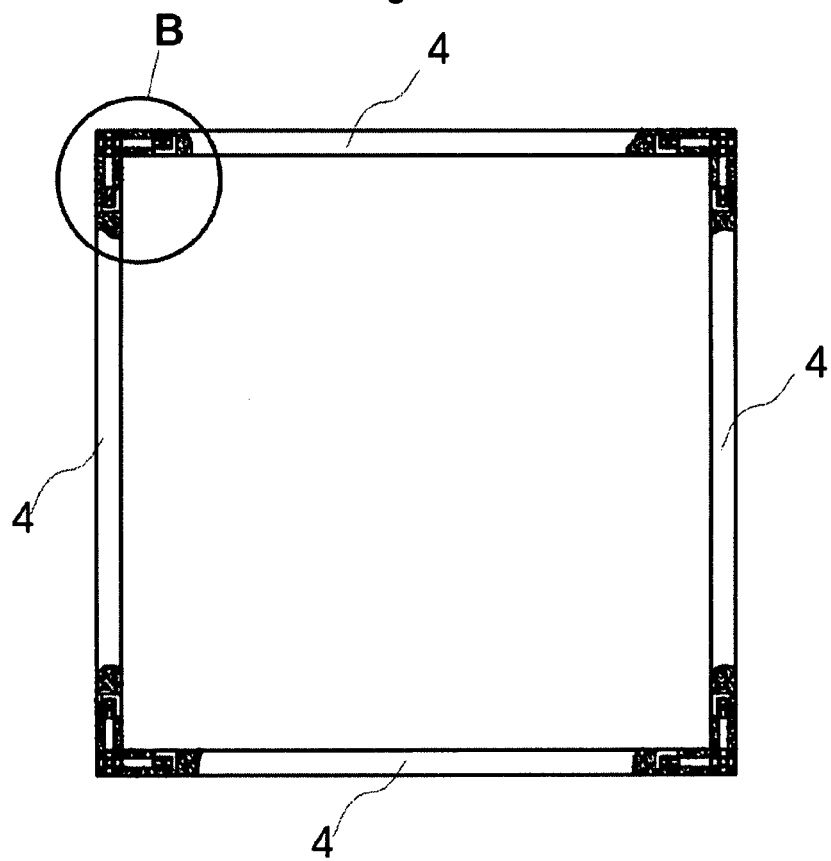
FIG. 5 is a cross-sectional view taken from the section A-A in FIG. 1.
Figure 6:
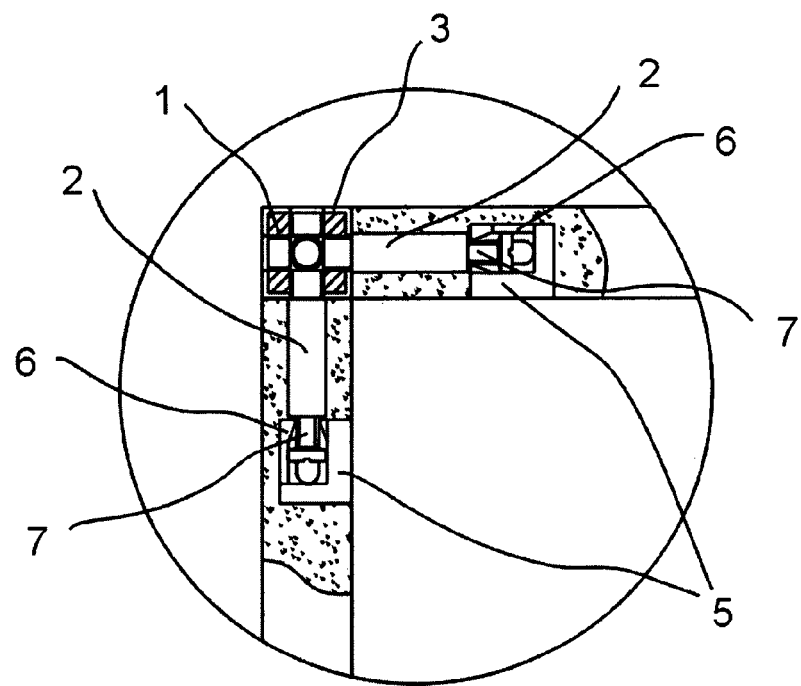
FIG. 6 is an amplified view of Section B in FIG. 6.

To make the panel connection using the said connection structure of panels, each of the said groove end 7 of the interlock bolt 2 positioned outwardly on the said interlock assembly 9 is to be inserted into the connecting panel 4 through the corresponding predrilled interlocking hole on the said connection end of the connecting panel 4, and securely engaged with the connecting panel 4 by turning the said rotatable cam lock 6 around 90° clockwise using a screw driver, thus the locking clasp of the said rotatable cam lock 6 thrusting engage forces to the concaved annular groove on the groove end 7 of the interlock bolt 2 on the said interlock assembly 9, to firmly connect the said interlock assembly 9 and the said connecting panel 4 as shown in FIG. 4. Thus, two or more connecting panels 4 are inter-connected via the said interlock assembly 9.

Embodiment 2

Figure 7:
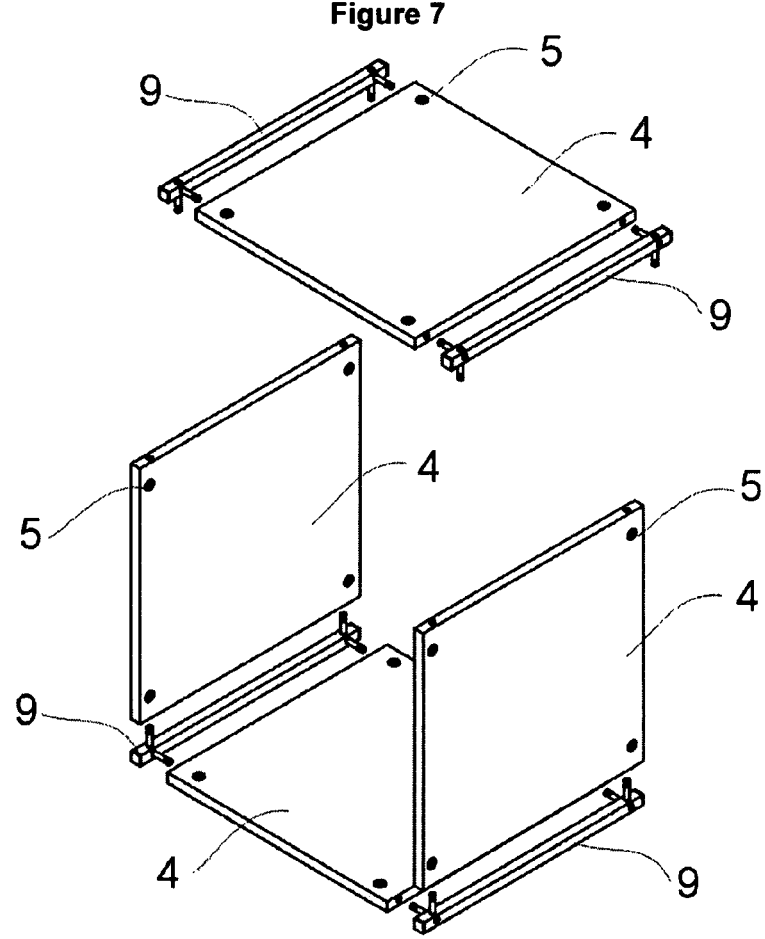
FIG. 7 is an exploded perspective view of a typical knock down, panel based furniture incorporating the panel interlocking structure of this invention.
Figure 8:
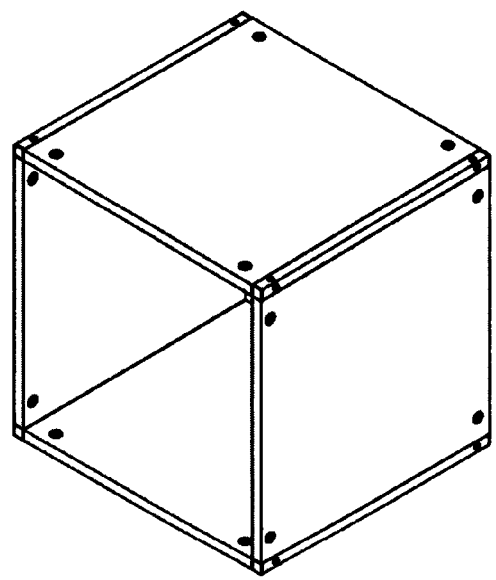
FIG. 8 is an assembled perspective view of a typical knock down, panel based furniture incorporating the panel interlocking structure of this invention.

FIG. 7 and FIG. 8 further illustrate a typical knock down, panel based furniture incorporating the said panel interlocking structure. The four connecting panels 4 to be connected each has two predrilled interlocking holes on both of its connection ends; on the cam lock side of each connecting panel 4 has four predrilled dead end holes 5 each corresponding and forming a perpendicular relation to the bottom opening of the said predrilled interlocking hole and disposed with a rotatable cam lock 5 with its opening opens to the bottom opening of the predrilled interlocking hole. To make a panel connection using the said panel interlocking structure, insert the groove end 7 of the interlock bolt 2 on the interlock assembly 9 respectively into the predrilled interlocking holes on the connecting panel 4, and turn the said rotatable cam lock 5 around 90° clockwise using a screw driver, wherein the locking clasp on the said rotatable cam lock 6 thrusts engage forces to the groove end 7 of the said interlock bolt 2 on the said interlock assembly 9 and securely engage with the said rotatable cam lock 5. Repeating the above steps respectively until all connecting panels 4 are firmly connected via the said interlock assemblies 9.

Embodiment 3

Figure 9:
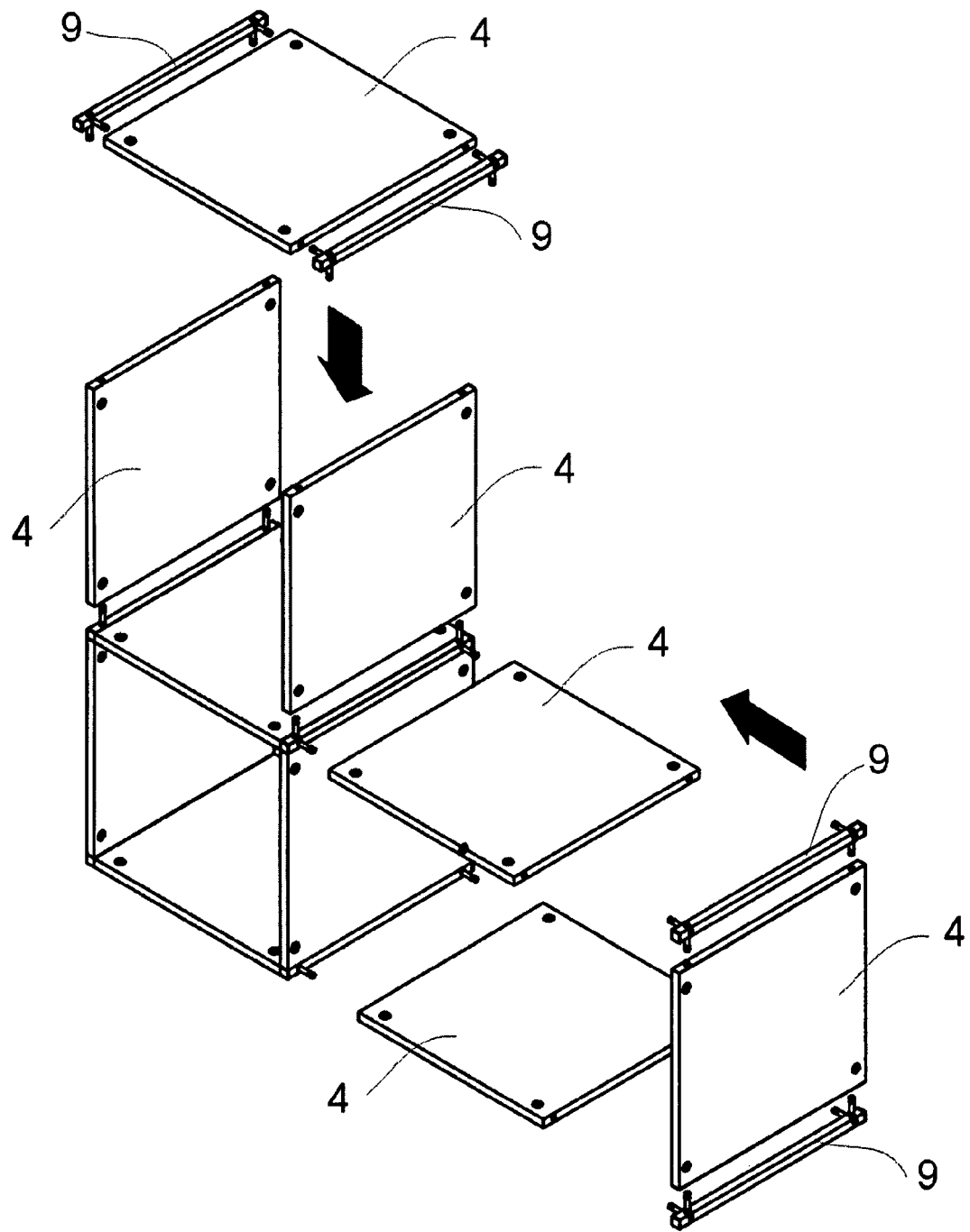
FIG. 9 is a perspective view of a typical knock down, panel based furniture incorporating the panel interlocking structure, showing the expandability provided by this invention in exploded condition.
Figure 10:
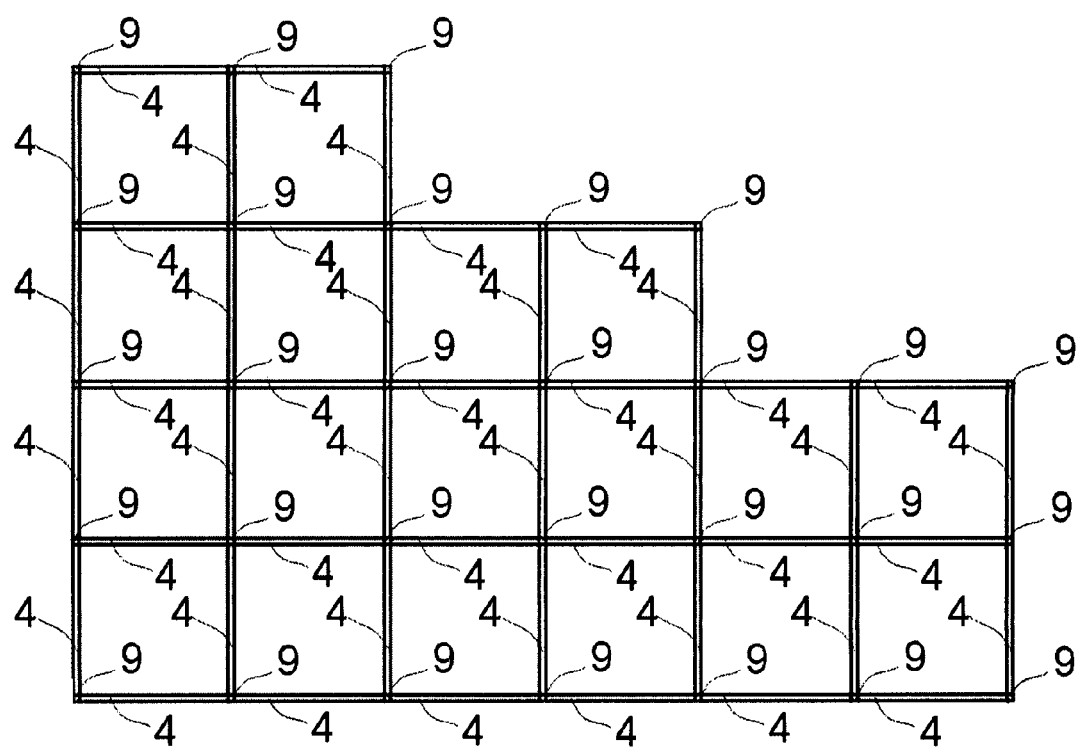
FIG. 10 is a schematic view of a multi-section knock down, panel based furniture incorporating the panel interlocking structure of this invention.

The expandability of knock down, panel based furniture using this invention is illustrated in FIG. 9 and FIG. 10. First, add additional interlock bolts 2 onto the existing interlock assembly 9 by fastening the tread end 10 of each interlock bolt 2 to the corresponding predrilled interlocking hole on the cubical nut 1 via the trans-passing hole on the lengthen rectangular face of the respective interlock tube 3 of the interlock assembly 9 where additional connecting panel 4 is to be connected; Second, slot the additional connecting panel 4 onto the corresponding groove end of the interlock bolt 2 on the interlock assembly 9 through the predrilled interlocking hole on the respective connection end of the said connecting panel 4, and position the said groove end 7 of the interlock bolt 2 to the opening of the disposed rotatable cam lock 5 on the said additional connecting panel 4; Third, turn the said rotatable cam lock 5 around 90° clockwise using a screw driver, thus the locking clasp on the said rotatable cam lock 5 thrusts engage forces on the groove end 7 of the interlock bolt 2 on the interlock assembly 9 and securely engage with the interlock assembly 9, thus additional connecting panels 4 are firmly connected via the said interlock assembly 9. Repeat the above mentioned steps to complete the expansion of the furniture to a certain size and style.

The panel interlocking structure of this invention can be applied to a wide range of knock down, panel based furniture, including display unit, wine rack, bookcase, TV and Hi-Fi cabinet and multipurpose cabinet, etc. A various accessories can be installed on to the furniture incorporating this invention, such as doors, glass doors and drawers.

INDUSTRIAL APPLICABILITY

This invention, with its panel interlocking structure comprising interlock assemblies 9 and connecting panels 4, wherein, the said interlock assembly 9 consists one interlock tube 3, at least two cubical nuts 1, and at least two interlock bolts 2, provide a convenient yet flexible way to assemble knock down, panel based furniture in different volume and style.

Compared with the conventional panel to panel direct connection structure, this invention provide a number of advantages over the exiting technology, including: improved durability as connecting panels 4 now are interlocked via the interlock assemble 9; enhanced mobility as the furniture can be easily assembled and disassembled; design-it-yourself capacity as user can determine the size, style and color of a given knock down, panel based furniture by choosing different combination of connecting panels 4, interlock assembly 9 and accessories; excellent expandability as user can expand the original furniture composition by adding additional connecting panels 4 onto the existing interlock assembly 9, thus forming additional furniture portion without buying a whole new furniture set. All advantages stated above are resulting substantial material, cost and resource savings.

The invention claimed is:

1. A panel interlocking structure for adjacent panels of knock down, panel based furniture, comprised of interlock assemblies and connecting panels, in which each said interlock assembly is comprised of one interlock tube, at least two cubical nuts and at least two interlock bolts, wherein:

said interlock tube has four lengthened rectangular faces and a continual square cross-section to its full length, and on each said lengthened rectangular face there are at least two predrilled trans-passing holes in predetermined positions;

each said cubical nut has six square faces, at the center of each said square face is one predrilled thread hole, with the central line of each said predrilled thread hole intersecting at the center point of the said cubical nut, and at least two said cubical nuts are to be disposed inside one said interlock tube in predetermined positions, with four said predrilled thread holes on the said cubical nut each opening to one corresponding said predrilled trans-passing hole on one said lengthened rectangular face of the said interlock tube;

each said interlock bolt consists of two engaging ends named the thread end and the groove end, wherein the said thread end has threads corresponding to the threads of the respective said predrilled thread hole of the respective said cubical nut, and the said groove end has a concaved annular groove;

said thread end of the said interlock bolt is to be fastened into one respective said predrilled thread hole on the respective said cubical nut disposed inside the said interlock tube, through the corresponding said predrilled trans-passing hole on the said interlock tube, thus securely engaged with the said interlock tube, and with the said groove end of the said interlock bolt positioned outwardly for interlocking with the said connecting panel, at least two said interlock bolts are to be engaged onto one said lengthened rectangular face of the said interlock tube in forming the said interlock assembly;

each said connecting panel has two opposed large surfaces and four small ends extending at right angles to both said large surfaces, wherein on one side of the said large surfaces, named the cam lock side, there are at least four predrilled dead end holes each with a rotatable cam lock disposed in it, and, wherein on two opposed sides of the said small ends, named the connection end, each comprised of at least two predrilled interlocking holes each at a position corresponding to one said predrilled trans-passing hole on the said interlock tube, with the bottom opening of each said predrilled interlocking hole opening to, and forming a perpendicular relation with the said corresponding predrilled dead end hole on the said cam lock side of the said connecting panel;

each said rotatable cam lock has one opening and one locking clasp, with its said opening open to the corresponding said predrilled interlocking hole on the said connection end of the said connecting panel through the said predrilled dead end hole, and the said locking clasp corresponding to the said concaved annular groove on the said groove end of the said interlock bolt;

each said groove end of the said interlock bolt positioned outwardly on the said interlock assembly is to be inserted into the said opening of the said rotatable cam lock disposed in the said cam lock side of the said connecting panel through the corresponding said predrilled interlocking hole on the said connection end of the said connecting panel, and securely engaged with the said connecting panel by turning the said rotatable cam lock around 90° clockwise [using a screw driver], thus the said locking clasp on the said rotatable cam lock thrusting engage forces to the said concaved annular groove on the said groove end of the said interlock bolt, therefore firmly connecting the said interlock assembly and the said connecting panel.

2. The panel interlocking structure of claim 1, wherein a number of said connecting panels connect to one another via at least one said interlock assembly, and four said lengthened rectangular faces on the said interlock tube of the said interlock assembly each can be used to interlock with one said connecting panel, thus each said interlock assembly can interlock up to four said connecting panels.

3. The panel interlocking structure of claim 1, wherein the said connecting panels can be either wooden, plastic or metal in material, and square or rectangular in shape.

4. The panel interlocking structure of claim 1, wherein a decorative cap can be used to close each end on the said interlock tube of the said interlock assembly.

* * * * *